Patented Aug. 14, 1945

2,382,938

UNITED STATES PATENT OFFICE 2,382,938

OXYGENATED ORGANIC POLYMERS

William F. Gresham, Wilmington, Del., assignor to E. I. du Pont de Nemours & Company, Wilmington, Del., a corporation of Delaware No Drawing. Application May 6, 1941,
Serial No. 392,127

10 Claims. (Cl. 260—67)

This invention relates to a process for the preparation of oxygenated organic polymers and more particularly to polymers obtained from linear formals.

An object of the present invention is to provide new polymeric compounds and processes for their preparation. Another object is to provide new polymeric compositions from polymerizable linear formals. Yet another object is to provide a process for the polymerization of linear formals. Still another object is to provide mixtures or interpolymers of linear formals with homologous polymerizable compounds, or with cyclic and alicyclic alkylene oxides and the like. Other objects and advantages of the invention will hereinafter appear.

It has been found that linear formals containing two or more functional goups, such groups being defined for the purpose of the specification as hydroxyl groups (OH) and formal groups (—OCH2O—), can be reacted to give products having a wide range of physical and chemical properties by contacting them with a suitable catalyst under properly controlled conditions. These products will be defined as polymers, which term will include the chemical combination of at least two polyfunctional linear formals as well as the intermediate products resulting from the polymerization which contain at least two glycol residues, e. g., the residues —CH2CH2O— and/or —CH2CH2OH.

The linear formals containing two or more functional groups which may be polymerized in accord with the invention include, for example: methyl, hydroxyethyl formal,

CH3OCH2O(CH2)2OH ethyl, hydroxyethyl formal,

C2H5OCH2O(CH2)2OH propyl, hydroxyethyl formal

C3H7OCH2O(CH2)2OH butyl, hydroxyethyl formal,

C4H9OCH2O(CH2)2OH methoxyethyl, hydroxyethyl formal,

CH3O(CH2)2OCH2O(CH2)2OH methyl-, ethyl-, propyl-, butyl-, and methoxyethyl-hydroxypropyl formals, which may be illustrated by the formula, ROCH2OC3H6OH, in which the R group is respectively methyl, ethyl, propyl, butyl, methoxyethyl, etc., and the higher alkyl hydroxyalkyl formals such as are disclosed in the copending application of Sussman et al., S. N. 288,587, filed August 5, 1939; di(βhydroxyethyl) formal, (HOCH2CH2O)2CH2; di[β-(hydroxyethoxy) methoxy]ethane, (HOCH2CH2OCH2O)2C2H4 and di[β(hydroxyethoxy) methoxyethyl]formal, (HOCH2CH2OCH2OCH2CH2O)2CH2 and the higher homologues HOCH2CH2(OCH2OCH2CH2)xOH where x is greater than 3; 1,2-di(isobutoxymethoxy) ethane, C4H9OCH2OCH2CH2OCH2OC4H9 and compounds of the general type

ROCH2OCH2CH2OCH2OR in which R is a lower alkyl group such as are described in the U. S. 2,350,350 of W. F. Gresham, patented June 6, 1944, and which are prepared by the polymerization of the reaction product from vicinal glycols and aldehydes in the presence of an acidic catalyst, which catalyst is destroyed before separating the product. Polyformal esters of polybasic acids are likewise polymerizable, e. g., the (methoxymethoxy)ethanol esters of oxalic, malonic, succinic, glutaric, adipic, pimelic, and the higher aliphatic dibasic acids as well as phthalic acid and generally acids having the formula CnH2n-8(COOH)2. Polymers may likewise be obtained from such compounds as β-(methoxymethoxy)ethyl(methoxymethoxy) acetate (CH3OCH2OCH2COOCH2CH2OCH2OCH3 and similar β-(alkoxymethoxyethyl) esters of alkoxy methoxy carboxylic acids and from di-(β-methoxymethoxy)ethanol esters of the dibasic acids, CH3OCH2OCH2CH2OOC(CH2)xCOOCH2CH2OCH2OCH3 in which x is greater than one, and the di(β-methoxy)ethyl esters of 1,1-di-(carbomethoxymethoxy) methane, these esters being obtainable by ester interchange of 1,1-di-(carbomethoxymethoxy) methane, CH2(OCH2COOCH3)2 disclosed in the copending application of Loder et al S. N. 326,427, filed March 28, 1940, which describes the preparation of the acetals of hydroxy aliphatic acids and their esters by the interaction of hydroxy aliphatic acids or their esters with aldehydes in the presence of an acid catalyst, and the (alkoxymethoxy) ethanols

ROCH2OCH2CH2OH disclosed in the copending application of Sussman et al., S. N. 288,587, which are prepared by the reaction of vicinal glycols with acetals in the presence of an acidic catalyst, the ester interchange reaction being carried out in the presence of an alkaline catalyst, such as sodium methoxide. Polymers of the latter types will have terminal reactive groups. Low molecular weight polymers of the linear formals of the invention can also be converted to higher molecular weight polymers by the process of the invention.

The polymerization is effected at temperatures ranging between −80 and +300° C. and preferably between 0 and 150° C. Atmospheric, sub- or superatmospheric pressures may be used, and if the last, pressures may range between 1 and 1000 atmospheres or higher. Normally excellent results are obtained at or about atmospheric pressure. If desired, the temperature of the reaction, especially when polymerization is carried out at the boiling point of the reaction mixture, may be controlled by varying the pressure on the boiling reactants.

It has been found advantageous to effect the polymerization in the presence of an acidic type catalyst such, for example, as sulfuric acid, phosphoric acid, hydrochloric acid, hydrofluoric acid (alone or with $BF_3$), boron fluoride (including its complexes with water, acids, esters, alcohols, and the like), paratoluene sulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth, as well as inorganic acids generally and their acid salts such as sodium acid sulfate, sodium acid phosphate, and so forth.

The catalyst may be supported or not on inert supports such as charcoal, silica gel (which alone is a catalyst for the reaction), kieselguhr, and so forth. Concentrations of $BF_3$, $H_2SO_4$, and similarly strong acid catalysts may be extremely low, less than 0.1%, and amounts down to as low as 0.001% of these strong acid catalysts have been found sufficient to give polymers although high concentrations of the catalyst even equal to or greater than the weight of the linear formal are likewise satisfactory.

The reaction is preferably continued approximately to equilibrium in order to effect the polymerization, or, if desired, reaction products are separated to force the reaction in one direction and until the molecular weight distribution wanted in the final product is attained. The reaction is generally continued for from 0.5 to 10 hours at temperature ranges between 25 and 150° C. and from 1 to 10 days at temperatures below 0° C., although shorter or longer reaction times may be employed, if desired; and the reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed, continuously if desired, by distillation under reduced pressures. As soon as the catalyst has been neutralized, the reaction ceases. The neutralized catalyst may be filtered off and the polymerized product which remains treated for the recovery of the polymers.

The linear formals may be polymerized in various ways. The polymerization may be carried out by treating the monomer and catalyst in the presence or absence of a solvent for the monomer and polymer and for this type of polymerization such solvents as 1,4-dioxane, benzene, and toluene may be used.

The polymerizable linear formals above referred to can be converted to products having a wide range of physical and chemical properties, by simultaneous polymerization in contact with homologous polymerizable compounds of the cyclic and alicyclic alkylene oxides. Compounds so obtained are in many instances interpolymers, although not necessarily so. For the preparation of such compounds, the polymerizable linear formals can be polymerized with the epoxides, such as ethylene oxide, 1,2- and 1,3-propylene oxides, tetramethylene oxide, isobutylene oxide, and their isomers and metamers. Interpolymers may likewise be made by polymerizing one linear formal of the class specified with another linear formal of the class. For example, interpolymers can be made by the simultaneous polymerization, in contact, of (methoxymethoxy)ethanol with di(beta hydroxyethyl) formal, any amount of the (methoxymethoxy)ethanol from 1 to 1000 per part of the di(beta hydroxyethyl) formal may be used.

The polymerization of polyfunctional linear formals does not ordinarily produce a single polymeric product, but generally gives two or more such products, the distribution of polymers present being determined inter alia by the temperature of the reaction and the type and concentration of catalyst employed. It may be desired to obtain from these products a given polymer and this can be effected by carrying out the polymerization by a process wherein a portion of the desired product is removed from the reaction zone and the undesired products returned to that zone together with the linear formal being polymerized.

Examples will now be given illustrating embodiments of the invention, but it will be understood that it will not be limited by the details thereof. Parts are by weight unless otherwise indicated.

*Example 1.*—A reaction mixture consisting of 1060 parts of (methoxymethoxy)ethanol and 3 parts of sulfuric acid was heated on a water bath at 40–50° C. and 28 mm. until 386 parts of lower boiling products were collected in a Dry-Ice cooled trap which was placed between the reaction vessel and a vacuum pump. The sulfuric acid was neutralized with a 28% solution of sodium methoxide. Materials boiling up to approximately 75° C./3 mm were removed. This gave 559 parts of water-white viscous liquid polymer which was soluble in water, benzene and methanol—hydroxyl No. 312; density at 25° C., 1.160; refractive index at 25° C., 1.5000; estimated molecular weight in boiling benzene, 320.

*Example 2.*—A reaction mixture, prepared by careful addition of 4 parts of sulfuric acid to 573 g. of (methoxymethoxy) ethanol, was processed under conditions set forth in Example 1 and until 152 parts of lower boiling materials collected in the Dry-Ice trap. Subsequent to neutralization of the catalyst with sodium methoxide dissolved in methanol, distillation under 3 mm. pressure, carried out until the head temperature reached 115° C., gave 216 parts of a colorless viscous liquid polymer—hydroxyl No. 326; density at 25° C., 1.080; refractive index at 25° C., 1.4480. The polymer was soluble in water, benzene and methanol.

*Example 3.*—A mixture consisting of 416 parts of β - (methoxymethoxy)ethyl(methoxymethoxy)-acetate,

CH₃OCH₂OCH₂COOCH₂CH₂OCH₂OCH₃, and 1 part of sulfuric acid was heated on a water bath under 40 mm. pressure until 115 parts of methylal was removed. The catalyst was neutralized with a slight excess of anhydrous ammonia. Removal of excess ammonia at 2 mm. and 100° C. gave 300 parts of a viscous liquid polymer that was only slightly soluble in water—saponification No. 384; refractive index at 25° C., 1.4580.

*Example 4.*—To 42.5 parts of di(methoxymethoxy)ethane, CH₃OCH₂OCH₂CH₂OCH₂OCH₃, cooled in an ice bath was added 0.1 part of boron fluoride. The reaction mixture so prepared, was distilled until 18.8 parts of methylal had been collected. The product was treated with anhydrous ammonia to destroy the catalyst, dissolved in benzene and the benzene filtered to remove inorganic precipitates. Removal of benzene under reduced pressure, finally to 1 mm. and 100° C., gave 21.5 parts of a viscous liquid polymer which was soluble in water.

*Example 5.*—A mixture of 62.3 parts of di-(methoxymethoxyethyl) adipate and 0.09 part of concentrated sulfuric acid was heated under reduced pressure at a pot temperature of 170° C. until 14 parts of methylal was removed. After the addition of 0.1 part of NaOH in 2 parts of water, the reaction mixture was topped to remove water and then filtered. The polymer, a pale yellow, viscous liquid, was soluble in benzene and insoluble in alcohol and water. Molecular weight in boiling benzene 728.

The compounds prepared in accord with the invention may be employed for a large number of uses. The lower molecular weight polymers and/or solutions of the higher molecular weight polymers in water or other suitable solvent may be employed in the uses designated below which require solubilized agents; e. g., as solvents, extractors, fungicidal uses, and so forth. The higher molecular weight polymers may be used as produced or in solution in many of the designated uses, such, for example, as those described under cosmetics, elastomers, leather and related materials.

In the textile industry, solutions of the polymers may be used as sizers for nylon, rayon, wool, silk, and cotton; as a size lubricant; or as a textile softener to improve hand, either as such or after treatment, e. g., after shrinkproofing. The polymers may also be employed as; plasticizers for artificial yarns; spinning assistants, mercerizing assistants; and modifying assistants for dye receptivity. They may be used for improving dye fastness; increasing cleaning, wetting, dispersing, spreading, emulsifying, levelling and dyeing capacities; fulling, after-treating, washing, and carbonizing; cross-linking (especially hydroxy-containing) polymers; and may be used to prevent mildew, rot and fungi infestation; improve creaseproof, crushproof and crinkleproof characteristics of textiles; and to give a permanent textile finish.

In the paint, varnish, polish and finishing industries, the polymers may be used in the preparation of furniture and shoe polishes; as emulsions or solid waxes; as hot melts with other solids, as the esters of methacrylic acid, "Opal-wax," polyvinyl alcohol resins, methylal ureas, etc.; as dressings for belts as non-slip, anti-squeak, and as a general preservative. They are useful as ingredients in adhesives; dispersing, spreading, binding, and wetting agent in paint, pigments, and lakes; as an agent to prevent livering in paints; as a substitute for alkyd varnishes and resins; as a termite repellent in lacquers and paint; as an ingredient of slow drying lacquers; as a binder for ceramic glazes—to be subsequently fired; and as wax and resin plasticizers generally.

In the preparation and use of ink the polymers described may be employed in the print roll composition; as an addition agent to the ink or to the roll to improve offsetting qualities, both in the offset process and to prevent offset or smear between sheets; as an emulsifying, spreading, binding, dispersing, agent, tack and viscosity improver, adhesion assistant, and livering preventive in printing inks; as a suspending medium for printing pastes; as an ingredient in duplicators, either in the ink or in the pad; and as a gloss improver.

The polymers are likewise useful in the paper industry as a paper size for waxing to make paper and cardboard oilproof and airproof; for improving wet strength of paper, as a substitute for natural waxes in carbon paper, as a paper plasticizer, coating for paper condensers and insulators, and for transparentizing paper.

In the rubber field the polymeric products may be used as preservatives, rubber plasticizers, plasticizers for artificial rubber-like materials, protective coatings for rubber, as an ingredient for incorporation with either rubber or artificial rubber to make them resistant to oil and gasoline, to improve low temperature flexibility, as an antioxidant, ozone resistant, and for making artificial rubber-like materials by reacting the polymers with glue.

Leather and related materials may be improved by these polymers as their use renders such materials fat-resistant. Furthermore, they may be used in fur mordanting, as a tanning agent, as an ingredient to make leather soft and pliable, as a preservative for footwear, ornaments, leather belting, etc., and as a "Fabrikoid" softener and coating agent.

These polymeric compounds have many important uses in the cosmetic industry as, for example, an emulsifying agent and as an ingredient in creams, lotions, lathers, hair dressings, etc.; are adaptable for use in the preparation of antiseptic soaps and as a binder for hand, abrasive, and toilet soaps; as an invisible glove component for protecting hands and face; as a permanent wave preparation; and as a water-soluble base for ointments and salves.

Chipping, corrosion and scratching of glass, china, metals, stone, wood, and like materials may be inhibited by coating with these polymers and they may also be used on electrical insulators or as an ingredient in electrical insulator compositions; as an impregnant for hood lacings, leaf springs, window channel linings, water pump stuffing, shoe sole liners, etc., and especially as a lubricant or anti-squeak. The polymers may be used as interliners for safety glass, and polaroid glass interlayers; wrapping materials for foods, bread, fruit, etc.; as a coating for fruits, vegetables, eggs, foods, etc., to be applied as a melt or solution to the comestibles against air and moisture; for the preparation of translucent screens; as an interpolymer with ethylene oxide, ethylene, vinyl compounds, or rubber-like polymer forming materials; and as a plastic emulsion ingredient.

The polymers may be likewise employed as plasticizers for cellulose and cellulose derivatives; for shrinkproofing acetate silk; as a sealing agent for oil and gas wells; drilling mud ingredient to control thixotropy, settling, etc.; grinding aid in clinker cement, flotation agent in ore treating, improving root growth, as an ingredient in insect and fungicidal sprays either as adhesive or active agent; as a water soluble wire and metal lubricant; as a bonding agent for finely divided materials; for sealing wounds in trees; as a water soluble ingredient for addition to artists' crayons; as a surface tension depressant for use with other surface active materials; as a plasticizer for glue, casein, proteins, gelatin, cork, etc. They may be employed as substitutes for glycerine foots in electroplating baths; as a cutting aid in metal turning; and as a metal cleaner. The polymeric products likewise may be incorporated with greases to improve lubrication, consistency, and the viscosity coefficient; as a gas absorbent; poison gas collector; dust collector in air conditioning; emulsifying agent in emulsion polymerization; as an addition to cellulose films to render them non-curling; and as an addition to cellulose nitrate and cellulose acetate to make non-corrosive; as a binder for abrasive wheels which completely volatilizes on firing; and as an ingredient in self-sealing tubes and tires.

I claim:

1. A process which comprises the polymerization of di($\beta$hydroxyalkyl)formal by contacting it with a strong acidic catalyst.

2. A process for the polymerization of di($\beta$hydroxyethyl) formal which comprises contacting di($\beta$hydroxyethyl) formal with a strong acidic catalyst at a temperature between $-80$ and $+300°$ C.

3. The process which comprises simultaneously polymerizing a polyfunctional linear mono 1,2-glycol formal containing at least two functional groups selected from the groups consisting of hydroxy aliphatic and formal groups with an alkylene oxide by heating in the presence of a strong acidic catalyst.

4. The process which comprises simultaneously polymerizing a polyfunctional linear mono 1,2-glycol formal containing at least two functional groups selected from the groups consisting of hydroxy aliphatic and formal groups with ethylene oxide by heating in the presence of a strong acidic catalyst.

5. Polymeric di(beta hydroxyethyl) formal.

6. A process which comprises introducing a di(beta-hydroxyalkyl) formal into a reaction zone, subjecting the formal to polymerization at a temperature between about 0 and 150° C. in the presence of a strong acidic catalyst, thereafter neutralizing the catalyst and removing the polymer formed.

7. A process which comprises introducing di-(beta-hydroxyethyl) formal into a reaction zone, subjecting the formal to polymerization at a temperature between about 0 and 150° C. in the presence of a strong acidic catalyst, and thereafter neutralizing the catalyst and removing the polymer formed.

8. A polymeric linear mono vicinal glycol formal which prior to polymerization consisted of a linear mono vicinal glycol formal containing at least two functional groups selected from the group consisting of hydroxy aliphatic and formal groups.

9. A polymeric linear mono vicinal glycol formal which prior to polymerization consisted of a mono vicinal glycol formal containing at least one free hydroxy aliphatic group.

10. A polymeric linear mono 1,2-glycol formal, which prior to polymerization consisted of a linear mono 1,2-glycol formal containing at least two functional groups selected from the group consisting of hydroxy aliphatic and formal groups.

WILLIAM F. GRESHAM.